(12) United States Patent
Damasceno et al.

(10) Patent No.: US 8,453,621 B2
(45) Date of Patent: Jun. 4, 2013

(54) INTEGRATED THROTTLE BODY FOR ELECTRONIC FUEL INJECTION SYSTEM AND METHOD OF MANUFACTURE

(75) Inventors: Carlos F. Damasceno, Chapel Hill, NC (US); Vishalsinh Kadam, Sanford, NC (US)

(73) Assignee: Magneti Marelli Powertrain USA, LLC, Sanford, NC (US)

( * ) Notice: Subject to any disclaimer, the term of this patent is extended or adjusted under 35 U.S.C. 154(b) by 316 days.

(21) Appl. No.: 12/910,438

(22) Filed: Oct. 22, 2010

(65) Prior Publication Data
US 2012/0097129 A1    Apr. 26, 2012

(51) Int. Cl.
*F02D 9/08* (2006.01)

(52) U.S. Cl.
USPC ........................................ 123/337; 264/297.8

(58) Field of Classification Search
USPC ....... 123/337, 399, 400, 472; 156/64; 29/888; 251/301
See application file for complete search history.

(56) References Cited

U.S. PATENT DOCUMENTS

| | | | |
|---|---|---|---|
| 5,797,589 A * | 8/1998 | Kalebjian et al. | 251/305 |
| 5,902,426 A | 5/1999 | Daly | |
| 6,505,643 B2 * | 1/2003 | Scholten et al. | 137/554 |
| 6,923,157 B2 * | 8/2005 | Torii et al. | 123/337 |
| 6,986,860 B2 * | 1/2006 | Schaefer et al. | 264/242 |
| 7,047,936 B2 * | 5/2006 | Suzuki et al. | 123/337 |
| 7,069,902 B2 | 7/2006 | Arai et al. | |
| 7,219,652 B2 * | 5/2007 | Ino et al. | 123/337 |
| 7,237,529 B2 * | 7/2007 | Hannewald et al. | 123/337 |
| 7,316,216 B2 * | 1/2008 | Neise et al. | 123/337 |
| 7,316,385 B2 * | 1/2008 | Hatada et al. | 251/305 |
| 7,328,507 B2 * | 2/2008 | Arai et al. | 29/888.4 |
| 7,536,991 B2 | 5/2009 | Kadam et al. | |
| 2003/0047703 A1 * | 3/2003 | Patterson | 251/301 |
| 2005/0022781 A1 * | 2/2005 | Arai et al. | 123/337 |
| 2006/0000997 A1 * | 1/2006 | Shimada et al. | 251/308 |
| 2008/0217817 A1 * | 9/2008 | McCullough | 264/328.2 |

* cited by examiner

*Primary Examiner* — Stephen K Cronin
*Assistant Examiner* — Joseph Dallo
(74) *Attorney, Agent, or Firm* — Locke Lord, LLP

(57) ABSTRACT

An integrated throttle body for an electronic fuel injection ("EFI") system and its method of manufacture. The integrated throttle body of the invention comprises a molded throttle body housing in which the throttle valve, shaft, bore and motor housing are all molded in a single shot from a suitable thermosetting resin or thixomolded from magnesium.

25 Claims, 4 Drawing Sheets

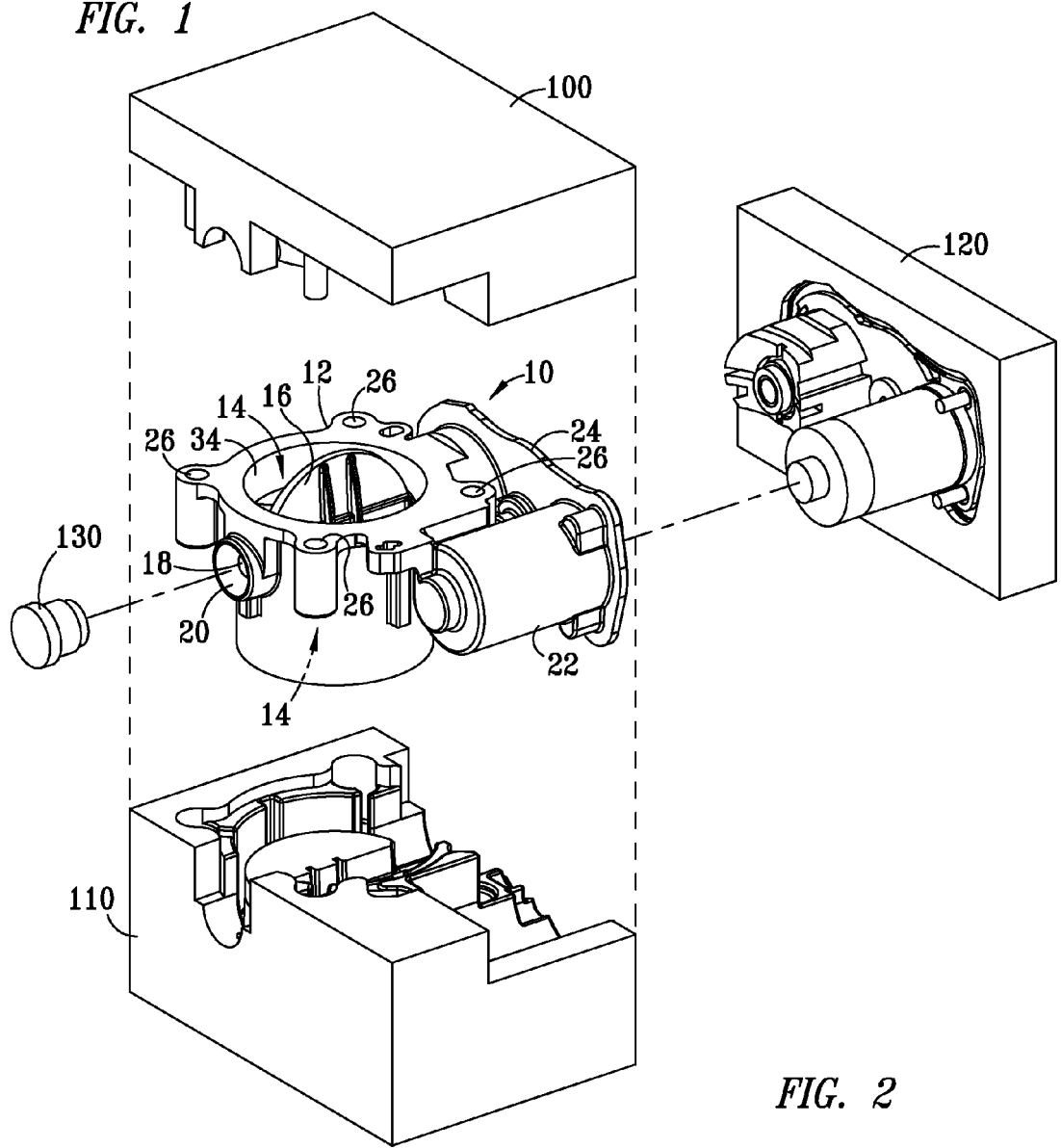
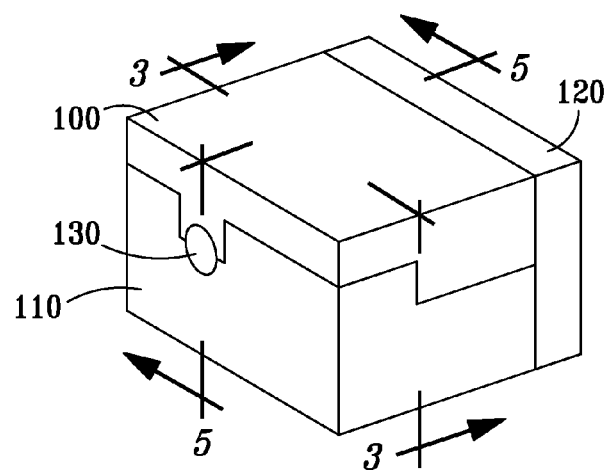

INTEGRATED THROTTLE BODY FOR ELECTRONIC FUEL INJECTION SYSTEM AND METHOD OF MANUFACTURE

BACKGROUND OF THE INVENTION

1. Field of the Invention

This invention relates to an integrated throttle body for an electronic fuel injection ("EFI") system and its method of manufacture. The integrated throttle body of the invention comprises a molded throttle body housing in which the throttle valve, shaft, bore and motor housing are all molded in a single shot from a suitable thermosetting material. Alternatively, the integrated throttle body can be thixomolded from magnesium.

2. Description of Related Art

Conventional throttle body housings for EFI systems have utilized a throttle valve and shaft that are manufactured separately from the housing and have required the use of clips, pins or other parts in addition to bearings to lock the throttle shaft and control axial movement along the central axis of the throttle bore. Although previous attempts have been made to mold throttle body housings out of polymeric materials, no one is known to have been able to mold the throttle valve and shaft in place inside the throttle housing so that the throttle housing and bearings can control axial movement of the throttle shaft without axial locking components.

Also, when the throttle valve, throttle valve and motor support are made separately from the throttle housing and bore in accordance with conventional technology, each component must have tight manufacturing tolerances so that the resultant throttle body assembly can maintain specified overall tolerances that are necessary for effective assembly and operation. This can be a particular concern when some parts are made from different materials having different coefficients of thermal expansion or from moldable polymeric resins that experience substantial shrinkage during post-mold cooling.

Another related concern with some conventional technologies utilizing molded plastic throttle bodies made of materials with high coefficients of thermal expansion can arise when the throttle bodies are used during extreme high or low temperature conditions. Because there is no engine coolant circulating around the polymeric throttle body, frost or ice can form on the throttle bore and valve in cold operating conditions, and can eventually lock the throttle valve plate, causing resultant operator control problems during start-up or operation. During hot weather conditions, expansion of the plate can sometimes cause the valve to jam inside the bore, again producing operator control problems.

An workable and fully functional integrated throttle body is therefore needed that will reduce concerns as noted above and that can be manufactured less expensively and with fewer parts. Such a device and a related method of manufacture that are useful for achieving the advantages described below are disclosed herein.

Some related prior art technologies are disclosed, for example, in U.S. Pat. Nos. 7,536,991; 7,069,902; 6,505,643; and 5,902,426.

SUMMARY OF THE INVENTION

Integrated throttle bodies for EFI systems and a method for manufacturing them are disclosed herein. An illustrative embodiment of the integrated throttle body of the invention comprises a molded throttle body housing in which the throttle valve, shaft, bore and motor housing are all desirably molded in a single shot using a suitable thermosetting resin. Alternatively, the integrated throttle body can be thixomolded from magnesium.

The integrated throttle bodies disclosed herein will enable those of ordinary skill in the art to produce a molded throttle body housing from a thermosetting material with the shaft and plate of the throttle body valve molded as a single part that is disposed inside the throttle bore in the same molding shot that produces the throttle body housing. The tool is made with the throttle valve plate and shaft cavities, and the tool slide will split in such way that the area of flow control will have no parting lines that can contribute to leakage around the valve plate. One or more "wings" can be provided to hold the throttle plate and shaft in place relative to the throttle bore during molding and then trimmed away later during the manufacturing process but prior to assembly of the other parts with the throttle body housing. Such wings are desirably located near the mold split lines.

The throttle body housing is desirably molded with a cavity that is cooperatively sized and oriented to receive the DC motor used to drive the shaft that opens the throttle valve during operation. Other throttle bottle housing cavities are desirably provided inside the throttle body housing to receive the shaft bearings, spring bushing, throttle spring and gears used to operate the throttle body. The throttle position sensor is desirably releasably attachable to the throttle body housing by spring clips or any other similarly effective known fastening device.

A suitable material for manufacturing the throttle body housing of the invention is desirably a thermosetting bulk molding compound that is dimensionally stable over a wide temperature range commensurate with the anticipated operating conditions, exhibits extremely low if any shrinkage during post-mold cooling, does not require axial control, resists warping and creep even during prolonged periods of use, is strong but lightweight, is chemically resistant to fluids typically encountered in the use environment, is not prone to icing under anticipated operating conditions, has excellent flammability resistance, is ecologically compatible and provides considerable cost savings compared to other known technologies. One such material is a fiber reinforced thermosetting polyester material comprising about 15 percent resin, about 25 percent fiberglass and about 60 percent mineral filler. Another suitable material is thixomolded magnesium.

BRIEF DESCRIPTION OF THE DRAWINGS

The apparatus of the invention is further described and explained in relation to the following drawings wherein:

FIG. 1 is an exploded perspective view showing one embodiment of the throttle body housing and throttle valve and shaft of the invention in relation to four separate mold sections used to unitarily mold the housing, valve and shaft in a single mold shot in accordance with an embodiment of the method of the invention;

FIG. 2 is a perspective view of the closed mold of FIG. 1, also showing the lines along which the sections of FIGS. 3 and 5 are taken;

DESCRIPTION OF ILLUSTRATIVE EMBODIMENT

Figure 3:
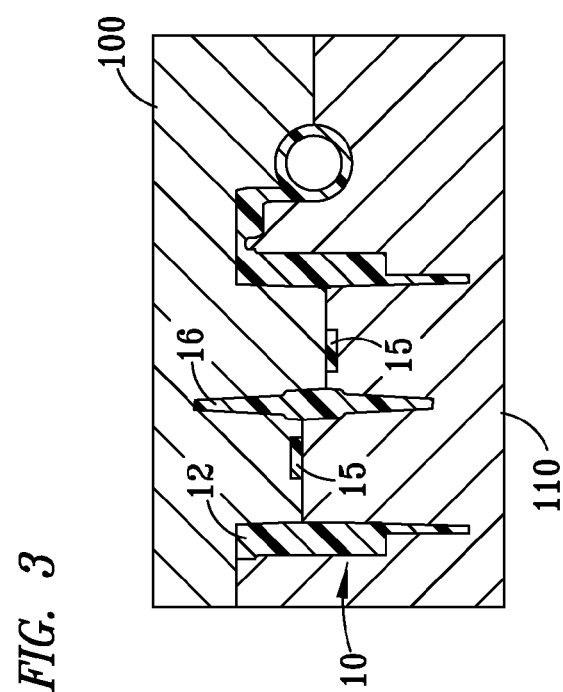
FIG. 3 is a cross-sectional view taken along line 3-3 of FIG. 2 when the mold is closed.

Referring to FIG. 1, one satisfactory embodiment of integrated throttle body 10 of the invention is depicted that comprises throttle body housing 12 defining cylindrical inside wall 34 of throttle bore 14, throttle valve plate 16, throttle shaft 18 and throttle shaft bore 20. Throttle shaft bore 20 is transverse to throttle bore 14 and has two coaxially aligned sections, one on each side of throttle bore 14. Shaft bore 20 receives throttle shaft 18 that is unitarily molded to throttle valve plate 16, and also comprises outwardly stepped cavities or recesses 30, 32 (visible in FIG. 6) that receive shaft bearings 208, 212 and spring bushing 214 (visible in FIG. 7). Integrated throttle body 10 also desirably comprises motor cavity 22 that is configured and aligned to receive a DC motor 202 (visible in FIG. 7) during assembly prior to use. Integrated throttle body 10 also desirably comprises plate 24 that provides additional structural integrity and serves as an attachment and support surface for throttle positioner sensor 222 and other ancillary components as shown and further described below in relation to FIG. 7. Integrated throttle body 10 also desirably comprises a plurality of attachment lugs 26 that are useful for bolting it to an engine.

Integrated throttle body 10 can be satisfactorily made from a moldable polymeric material that is dimensionally stable at temperatures ranging from about −40 C to about 150 C, that exhibits very little if any (preferably zero) shrinkage during post-mold cooling, that is strong and durable, and that exhibits resistance to creep, flammability and chemical degradation in the presence of automotive fluids. One such material is a thermosetting bulk molding compound, preferably comprising about 15 percent polyester resin, about 25 percent chopped glass strands, about 60 percent mineral filler, and minor amounts of other optional components believed known to those skilled in producing such compounds. A particularly preferred material for use in the present invention is BMC 455, a proprietary bulk molding compound marketed by Bulk Molding Compounds, Inc. Alternatively, magnesium can also be used to produce integrated throttle body 10 by using the thixomolding process in accordance with the method of the invention.

FIG. 1 also depicts four open mold sections 100, 110, 120, 130 that, when closed, define the cavities into which thermosetting bulk molding compound or other moldable material suitable for the intended application can be injected during the molding process. It will be appreciated by those of skill in the art upon reading this disclosure that mold sections 100, 110, 120, 130 are metal tools that are attachable to the platens, slides, or other similar structures of an injection molding machine that allow the mold to be closed and opened during each cycle of operation. Mold sections 100, 110, 120, 130 contain projections and cavities as required to produce the associated cavities and projections, respectively, of the molded integrated throttle body 10. FIG. 2 depicts mold sections 100, 110, 120, 130 when the mold is in the fully closed position.

Figure 4:
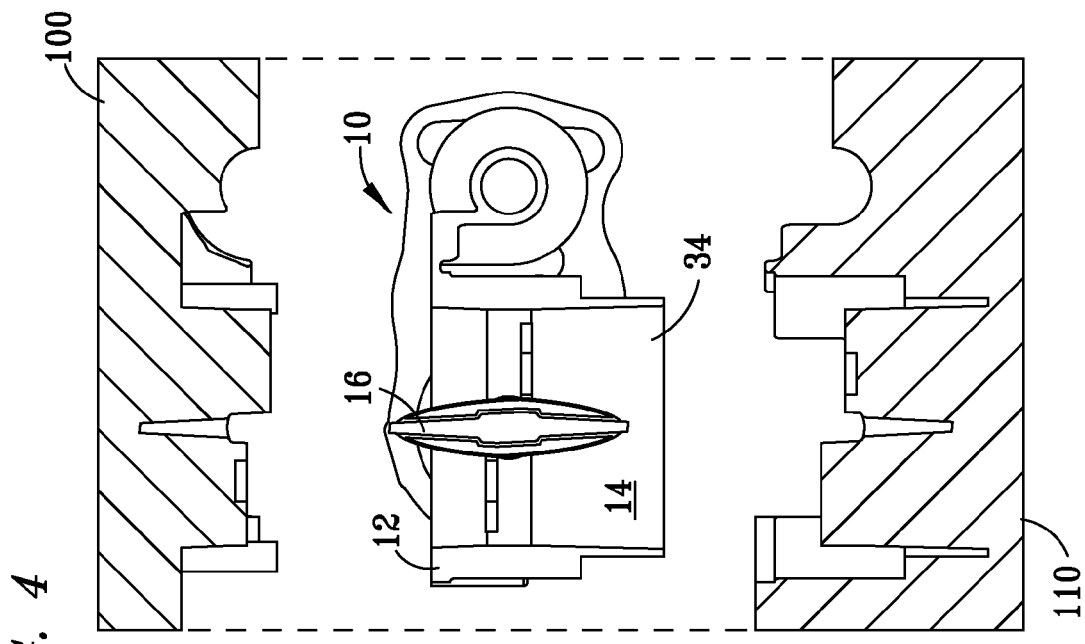
FIG. 4 is a cross-sectional view taken along line 3-3 of FIG. 2 when the mold is open.

FIG. 3 is a cross-section taken along line 3-3 of FIG. 2, and depicts a portion of integrated throttle body 10 that is visible when the closed mold is sectioned along that line. FIG. 3 also depicts the position of the mold parting line between mold sections 100, 110 as it traverses that cross-section. It is apparent from FIG. 3 that throttle valve plate 16 is molded in place in the same molding shot as integrated throttle body 10. The ability to mold throttle valve plate 16 and throttle shaft 18 as a single piece with throttle valve plate 16 in place inside throttle bore 14 in a single mold shot is a departure from other known throttle body technologies and provides significant advantages over them with regard to manufacture, assembly, operation, environment and lower cost. Problems previously associated with locking the throttle plate to the throttle shaft, axial control of the throttle shaft, icing or jamming of the throttle plate inside the throttle bore, manufacturing tolerances for multiple parts, and differing thermal expansion coefficients of different materials, for example, are all eliminated through use of the invention disclosed herein. The resultant integrated throttle body 10 can be produced repeatedly, reliably and at much lower cost than using conventional technologies. Furthermore, by configuring mold sections 100, 110, 120, 130 as shown, and by positioning the mold parting lines so that they do not interfere with the passage of fluid through throttle bore 14 or the movement of throttle valve plate 16 relative to sidewall 34 of throttle bore 14 (FIG. 1), fluid leakage around throttle valve plate 16 and other operational difficulties sometimes associated with the use of conventional molding technologies as applied to throttle bodies are also eliminated. Referring to FIG. 4, mold sections 100, 110 are separated as the mold is opened, revealing the unitarily molded, integrated throttle body 10.

Although throttle valve plate 16 and throttle shaft 18 are required to move relative to throttle body housing 12 during operation to control the amount of air entering an engine, it will be appreciated upon reading this disclosure that a plurality of removable wings can be provided to facilitate attachment points between the throttle shaft and throttle housing during molding. Such wings can then be trimmed away or otherwise removed following removal of integrated throttle body 10 from the mold.

Figure 6:
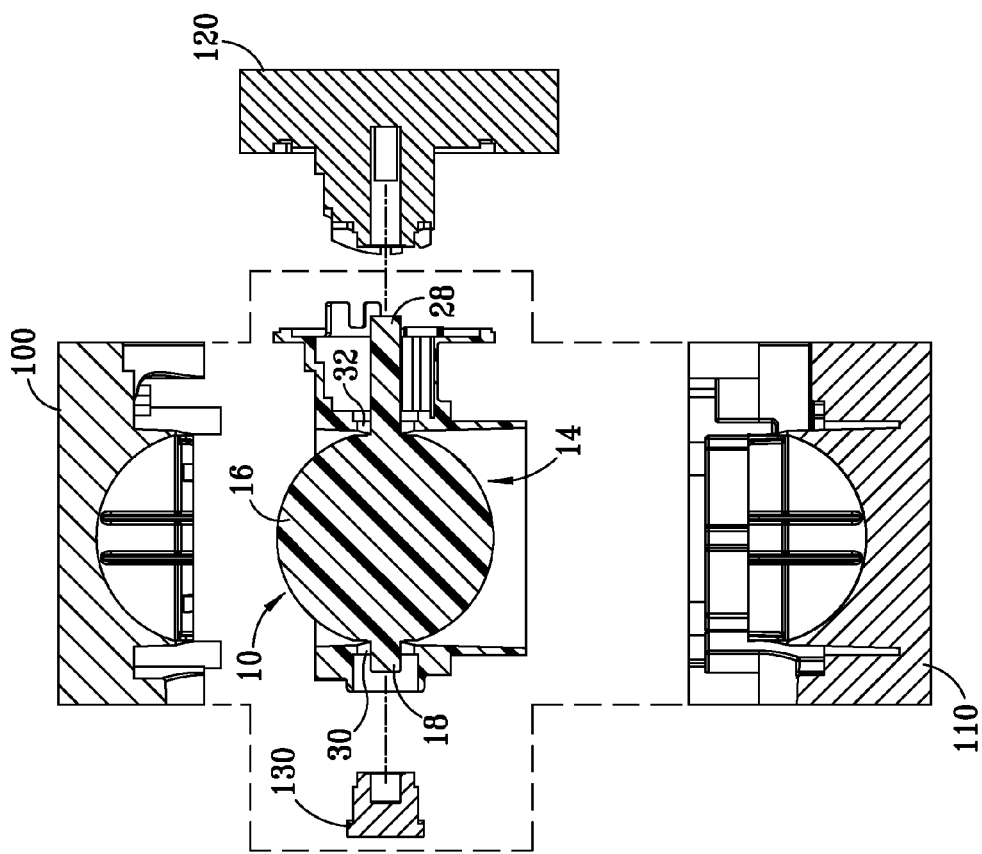
FIG. 6 is a cross-sectional view taken along line 5-5 of FIG. 2 when the mold is open.
Figure 5:
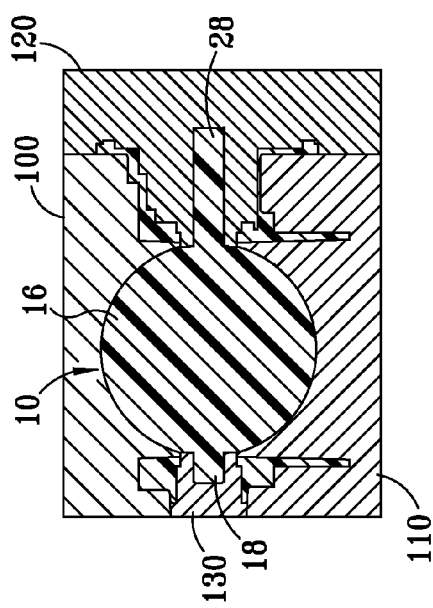
FIG. 5 is a cross-sectional view taken along line 5-5 of FIG. 2 when the mold is closed.

FIG. 5 is a cross-section taken along line 5-5 of FIG. 2, and depicts a portion of integrated throttle body 10 that is visible when the closed mold is sectioned along that line. FIG. 5 also depicts the position of the mold parting lines between mold sections 100, 110, 120, 130 as they traverse that cross-section. FIG. 5 depicts opposite end 28 of throttle shaft 18, of which only a small portion is visible in FIG. 1, and further depicts a full-length cross-section of throttle valve plate 16 and throttle shaft 18, 28. Referring to FIG. 6, mold sections 100, 110, 120, 130 are separated as the mold is opened, revealing the unitarily molded, integrated throttle body 10. In the open mold view of FIG. 6, the positioning of throttle valve plate 16 and throttle shaft 18, 28 in relation to throttle bore 14 is more clearly visible. Cavities or recesses 30, 32 that receive shaft bearings 208, 212 and spring bushing 214 during assembly of the integrated throttle body 10 with the other related components are also visible in this view.

Figure 7:
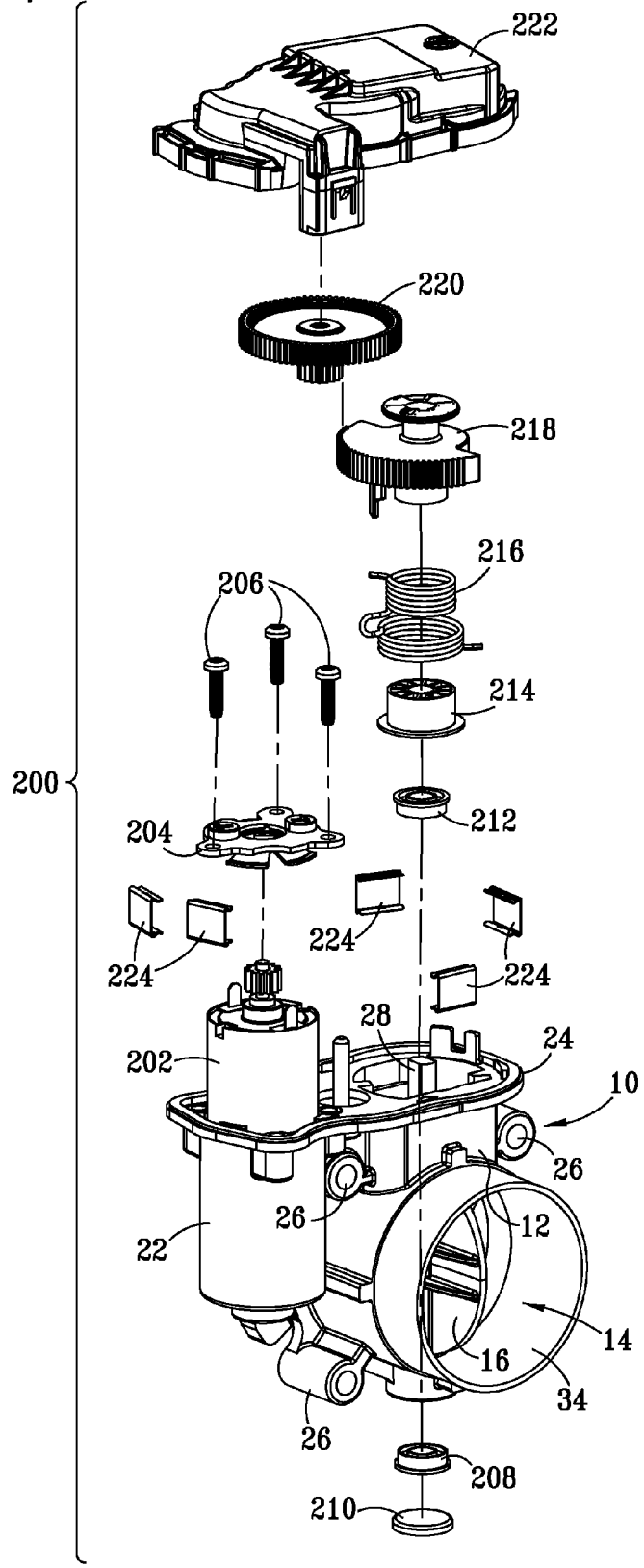
FIG. 7 is an exploded view showing other parts of an electronic fuel injection system as they would be installed into the throttle body housing of FIG. 1.

FIG. 7 is an exploded view showing a plurality of ancillary components that can be assembled together with integrated throttle body 10 of the invention to produce a throttle body assembly 200 prior to attaching it to an engine for use in an EFI system. These can include, for example, drive motor 202, motor holder 204 (which is secured to integrated throttle housing 12 by bolts 206), throttle shaft bearings 208, 212, far side bearing cap 210, spring bushing 214, throttle spring 216, sector gear 218, double gear 220 and throttle positioning sensor 222. Throttle positioning sensor 222 can be releasably attached to cooperatively configured attachment plate 24 of integrated throttle body 10 using spring clips 224 or some other similarly suitable fastening device.

As described above, a method is disclosed for molding an integrated throttle body for an electronic fuel injection system for an internal combustion engine whereby the molds are configured in such manner that the integrated throttle body desirably comprises a unitarily molded throttle body housing defining a throttle bore, a motor cavity and a throttle shaft cavity, the throttle shaft cavity being disposed transverse to the throttle bore; and a throttle valve plate and shaft disposed inside the throttle bore and the throttle shaft cavity. The molding is desirably achieved by using a plurality of mold sections that come together in such manner that no mold parting lines are disposed on the inside surface of the throttle bore. A moldable thermosetting material comprising polyester resin, chopped glass fibers and mineral filler are desirably used as a bulk molding compound for making the integrated throttle body. Alternatively, the integrated throttle body can be thixomolded from magnesium if desired.

Other alterations and modifications of the invention will likewise become apparent to those of ordinary skill in the art upon reading this specification in view of the accompanying drawings, and it is intended that the scope of the invention disclosed herein be limited only by the broadest interpretation of the appended claims to which the inventor is legally entitled.

We claim:

1. An integrated throttle body for an electronic fuel injection system for an internal combustion engine, the throttle body comprising:
    a unitarily molded housing defining a throttle bore, a motor cavity and a throttle shaft cavity, the throttle shaft cavity being disposed transverse to the throttle bore; and
    a throttle valve plate and shaft molded in place inside the throttle bore and the throttle shaft cavity;
    wherein the throttle valve plate and throttle shaft are molded as an attachment to the throttle body housing through the use of removable wings.

2. The integrated throttle body of claim 1 wherein the throttle body housing and the throttle valve plate and shaft are molded in a single shot.

3. The integrated throttle body of claim 1 wherein the throttle body housing and the throttle valve plate and shaft are molded from a thermosetting bulk molding compound.

4. The integrated throttle body of claim 3 wherein the thermosetting bulk molding compound comprises polyester resin, chopped glass strands and mineral filler.

5. The integrated throttle body of claim 1 wherein the throttle body housing and the throttle valve plate and shaft are thixomolded from magnesium.

6. The integrated throttle body of claim 1 wherein the throttle shaft cavity further comprises shaft bearing cavities disposed on opposed sides of the throttle valve plate.

7. The integrated throttle body of claim 1 wherein the throttle shaft cavity further comprises a throttle spring bushing cavity.

8. The integrated throttle body of claim 1 wherein no mold parting lines are disposed on the inside surface of the throttle bore.

9. The integrated throttle body of claim 1 wherein the throttle valve plate and throttle shaft are unitarily molded.

10. The integrated throttle body of claim 1 in combination with a DC motor.

11. The integrated throttle body of claim 1 in combination with a plurality of shaft bearings.

12. The integrated throttle body of claim 1 in combination a throttle spring bushing.

13. The integrated throttle body of claim 1 in combination with a throttle spring.

14. The integrated throttle body of claim 1 in combination with at least one throttle shaft drive gear.

15. The integrated throttle body of claim 1 in combination with a sector gear.

16. The integrated throttle body of claim 1 in combination with a throttle position sensor.

17. A method for molding an integrated throttle body for an electronic fuel injection system for an internal combustion engine, the method comprising unitarily molding a throttle body housing defining a throttle bore, a motor cavity and a throttle shaft cavity, the throttle shaft cavity being disposed transverse to the throttle bore; and a throttle valve plate and shaft disposed inside the throttle bore and the throttle shaft cavity; wherein the throttle valve plate and throttle shaft are molded as an attachment to the throttle body housing through the use of removable wings.

18. The method of claim 17 wherein the throttle body housing and the throttle valve plate and shaft are molded in a single shot.

19. The method of claim 17 wherein the throttle body housing and the throttle valve plate and shaft are molded from a thermosetting bulk molding compound.

20. The method of claim 19 wherein the thermosetting bulk molding compound comprises polyester resin, chopped glass strands and mineral filler.

21. The method of claim 17 wherein the throttle body housing and the throttle valve plate and shaft are thixomolded from magnesium.

22. The method of claim 17 wherein the throttle shaft cavity further comprises shaft bearing cavities disposed on opposed sides of the throttle valve plate.

23. The method of claim 17 wherein the throttle shaft cavity further comprises a throttle spring bushing cavity.

24. The method of claim 17 wherein no mold parting lines are disposed on the inside surface of the throttle bore.

25. The method of claim 17 whereby the throttle valve plate and throttle shaft are unitarily molded.

* * * * *